United States Patent [19]
Ernst

[11] Patent Number: 5,572,674
[45] Date of Patent: Nov. 5, 1996

[54] METHOD OF DYNAMICALLY ADJUSTING SNA NETWORK CONTROL PROGRAM PARAMETERS

[75] Inventor: Theodore R. Ernst, Sugar Land, Tex.

[73] Assignee: BMC Software, Inc., Houston, Tex.

[21] Appl. No.: 543,467

[22] Filed: Oct. 16, 1995

Related U.S. Application Data

[63] Continuation of Ser. No. 1,195, Jan. 7, 1993, abandoned.
[51] Int. Cl.$^6$ ................................................ H04L 12/26
[52] U.S. Cl. ............................. 395/200.1; 395/200.11; 395/184.01; 370/13; 370/17; 364/16.1; 364/242.94; 364/264.2; 364/264.5
[58] Field of Search .................................. 364/184–186; 370/13, 17; 371/20.1; 385/200.1, 200.11, 184.01, 600, 700, 800

[56] References Cited

U.S. PATENT DOCUMENTS

| | | | |
|---|---|---|---|
| 4,031,375 | 6/1977 | Jaskulke et al. | 371/16.1 |
| 4,500,951 | 2/1985 | Sugimoto et al. | 364/186 |
| 4,644,532 | 2/1987 | George et al. | 370/112 |
| 4,827,411 | 5/1989 | Arrowood et al. | 395/600 |
| 4,872,165 | 10/1989 | Mori et al. | 371/11.2 |
| 5,111,460 | 5/1992 | Botzenhardt et al. | 371/29.1 |
| 5,115,432 | 5/1992 | Haas | 370/94.1 |
| 5,193,151 | 3/1993 | Jain | 395/200.06 |
| 5,333,308 | 6/1994 | Ananthapillai | 395/182.02 |

FOREIGN PATENT DOCUMENTS 2255877  11/1992  United Kingdom .

OTHER PUBLICATIONS

Abdelmonem, A. H. et al. "Availability and Performance of Self–Healing Telecommunications Networks and Their Impact on 113M SNA Session Performance, Availability and Reliability" in Future Trends of Distributed Computing Systems, pp. 245–252 (1990).

Wallace, B. "Accunet T1.5 Option Gives Users Greater Net Control" in Network World, vol. 5, No. 17 (Apr. 25, 1988) p. 1.

*Primary Examiner*—Lance Leonard Barry, Esq.
*Attorney, Agent, or Firm*—Arnold, White & Durkee

[57] ABSTRACT

A method in accordance with the invention is implemented via a set of novel computer programs referred to for convenience as NEWPROG. A "controller NEWPROG," resides in one or more communication controllers on an SNA network as a "front end" processor for the NCP executing in that controller. The controller NEWPROG uses interception techniques to monitor the controller's incoming and outgoing messages and thereby 1) collect statistical information about network performance, and 2) exchange "backchannel" messages with controller NEWPROGs operating in adjacent controllers. The controller NEWPROG can alter dynamically the tuning parameters in that NCP. A "host NEWPROG" executes in a host computer to provide a monitoring and control station for a network administrator. The host NEWPROG communicates with controller NEWPROGs on the network via a virtual logical unit (VLU) executing within at least one controller. The host NEWPROG and controller NEWPROGs collectively act as a set of "shadow" control programs operating as a distributed monitor system. The shadow programs collaborate to optimize network performance and permit a network administrator to tune the network manually; in addition, the controller NEWPROG can tune its associated NCP automatically without program regeneration and without the need for involvement by the host NEWPROG.

3 Claims, 11 Drawing Sheets

Microfiche Appendix Included
(5 Microfiche, 418 Pages)

| Category | Manual (●=YES) | Dynamic (●=YES) | Parameter | Saves Storage (●=YES) | Saves CPU Cycles (●=YES) | Increases Throughput (●=YES) |
|---|---|---|---|---|---|---|
| Front End Processor (FEP) | ● | ● | Boundary PIU Pool (BPOOL) | ○ | ○ | ● |
|  | ● | ○ | CWALL | ○ | ○ | ● |
|  | ● | ○ | SLODOWN | ○ | ○ | ● |
| Physical Unit (PU) | ● | ● | AVGPB | ● | ○ | ● |
|  | ● | ○ | DATMODE | ○ | ○ | ● |
|  | ● | ○ | GP3174 | ○ | ● | ● |
|  | ● | ○ | IRETRY | ○ | ○ | ● |
|  | ● | ● | MAXDATA | ● | ○ | ● |
|  | ● | ● | MAXOUT | ● | ○ | ● |
|  | ● | ● | PASSLIM | ○ | ○ | ● |
|  | ● | ● | RETRIES(n) | ○ | ○ | ● |
|  | ● | ● | RETRIES(t) | ○ | ○ | ● |
| Transmission Group (TG) | ● | ● | TG Low Priority Threshold | ● | ● | ● |
|  | ● | ● | TG Medium Priority Threshold | ● | ● | ● |
|  | ● | ● | TG High Priority Threshold | ○ | ● | ● |
|  | ● | ● | TG Total Priority Threshold | ● | ● | ● |
| Virtual Route (VR) | ● | ○ | Current Window Size | ● | ● | ● |
|  | ● | ○ | Minimum Window Size | ● | ● | ● |
|  | ● | ○ | Maximum Window Size | ● | ● | ● |
|  | ● | ● | VR PIU Pool Threshold | ● | ○ | ● |
| Link | ● | ● | DELAY | ● | ● | ● |
|  | ● | ● | HDXSP | ○ | ○ | ● |
|  | ● | ○ | LSPRi | ○ | ○ | ● |
|  | ○ | ● | Multi-Link TG List | ○ | ○ | ● |
|  | ● | ● | PAUSE | ○ | ● | ● |
|  | ● | ● | RETRIES(m) | ○ | ○ | ● |
|  | ● | ● | SERVLIM | ○ | ○ | ● |
|  | ● | ○ | TRANSFR | ○ | ○ | ● |

FIG. 11

METHOD OF DYNAMICALLY ADJUSTING SNA NETWORK CONTROL PROGRAM PARAMETERS

This application is a continuation of application Ser. No. 08/001,195, filed 7 Jan. 1993, entitled "Method of Dynamically Adjusting SNA Network Control Program Parameters" now abandoned.

1. BACKGROUND OF THE INVENTION

1.1 Introduction

The invention relates to a method of dynamically optimizing network control parameters in a Systems Network Architecture (SNA) network. For purposes of illustration, one implementation of the invention is described in connection with the well-known IBM Virtual Terminal Access Method (VTAM) software running on IBM or plug-compatible mainframe computers. It will be appreciated by those of ordinary skill having the benefit of this disclosure that the invention can be similarly implemented in other SNA-compliant networks, e.g., those involving an IBM AS/400 or similar computer.

The details of SNA are extensively documented in a variety of widely available publications and other references. The IBM publication "SNA Technical Overview," publication no. GC30-3073-3, hereafter "[SNATechOv]," is incorporated by reference as nonessential background information familiar to those of ordinary skill. Chapters 1 and 2 and the glossary of [SNATechOv] potentially are especially helpful.

The microfiche appendices, together which comprise 5 sheets of microfiche having 418 frames, submitted as part of this specification include a) Appendix 1, selected source code extracts from a commercial software package distributed by the assignee of this application under the trademark "OPERTUNE," as well as b) Appendix 2, a reference manual setting out detailed technical information for network administrators and distributed as part of the software package. Permission is granted to make copies of the microfiche appendices solely in connection with the making of facsimile copies of this application in accordance with applicable law; all other rights are reserved, and all other reproduction, distribution, creation of derivative works based on the contents, public display, and public performance of the microfiche appendices or any part thereof are prohibited by the copyright laws.

1.2 Overview of SNA Architecture & Glossary of Terms

The concepts discussed in the overview explanation that follows are illustrated in FIG. 1, which is a block diagram showing the hierarchical nature of the SNA architecture, and in FIG. 2, which is a functional block diagram showing a typical message path from an end-user at a terminal LU to a host computer P5 and back.

SNA was developed as a hierarchical architecture organized into groups that have specific functions. SNA "nodes" are collected into a structure of "networks," "domains," and "subareas" as explained in the following glossary of selected terms well known to those of ordinary skill:

37xx: the product number of a series of communication controllers introduced by IBM between 1975 and the present. These controllers are responsible for relieving the central processing unit of much of the burden of communications management. The 37xx series executes a software program called Network Control Program (NCP) that controls and directs communication controller activity.

APPN: Advanced Peer-to-Peer Networking, a newer form of SNA communication whereby Physical Unit Type 2.1 nodes can initiate sessions with one another without going through VTAM.

Bottleneck: a network problem that occurs when messages are entering one or more network components faster than they can be forwarded to their destinations.

Boundary link: a link comprising part of a path between two SNA nodes and physically terminating in or attached to one of the nodes. See also Intermediate link.

Channel: an SNA channel (sometimes referred to as a "370 data channel") is a communications path, largely local to a host computer and its on-site peripherals, that makes use of a specific SNA communications protocol. See generally [SNATechOv] FIG. 1–3. Channels are sometimes referred to colloquially as "channel attachments" attached to a host computer. The protocol used in channel attachments is characterized by comparatively high data throughput, e.g., 3 million bytes per second (Mbps) and higher.

Controller: a communications controller (sometimes referred to as a "cluster controller") provides an interface between an SNA network and one or more end users at terminals to the SNA network. It buffers the entries that users make at their terminals. When polled by the NCP, the cluster controller delivers the buffers to the NCP. When the NCP selects and delivers messages to the cluster controller, the cluster controller receives the buffers and delivers each message to the correct terminal.

CUA: Common User Access, a series of specifications for the interface between the user and applications executing on IBM and compatible mainframes. CUA specifies how information is presented, and how the user selects application options.

Domain: all subareas that are controlled by a common VTAM (P5) node.

FEP: Front End Processor, a name given to the 37xx series and compatible communication controllers.

Intermediate link: a link comprising an intermediate part of a path between two SNA nodes but not physically terminating in or attached to either node. See also Boundary link.

JCL: Job Control Language.

Load module: a module of executable program code formatted to be loaded into a processor memory for execution.

Link: a communications path between two nodes in an SNA network, normally operating in conformance with the Synchronous Data Link Control (SDLC) communications protocol.

LU: logical unit.

Modem delay: the time required for the modem circuitry to modulate and demodulate digital information within the sending and receiving modems. A typical modem delay is from 15 to 50 milliseconds per modem pair per transmission.

MVS: IBM's Multiple Virtual Storage operating system.

NCP: see Network Control Program.

Network: all connected domains.

Network architecture: the rules that govern the services, functions, and protocols of network components. A widely used network architecture is the Systems Network Architecture (SNA) developed by IBM.

Network Control Program (NCP): an IBM computer program that executes in the controller hardware to perform the work of network communication for remote connections. The NCP polls the cluster controllers to send and receive messages and controls dialing and answering modems that are attached to it. The NCP routes messages that are destined for other subareas.

Network resource: the speed or capacity of a physical network component that is needed by network users to move data from one point to another in a network.

Network user: an end user or application that requires network resources to complete assigned tasks.

Node: a set of hardware, and the software associated with that hardware, that implements all seven standard layers of the SNA architecture (which are physical control, data link control, path control, transmission control, data flow control, presentation services, and transaction services).

Overutilization: a network problem that occurs when the number of network users exceeds the capacity of a network resource. Network users must either accept less of the resource than they requested, or wait longer to acquire the requested amount. See also Underutilization.

Propagation delay: the amount of time required for electrical signals or electromagnetic waves to move from one end of a link to another. The propagation delay for a 300 foot (91.5 meter) cable is about 4 microseconds. The propagation delay from a ground station to a satellite in geosynchronous orbit is about 150 milliseconds.

P2: a designation for a cluster controller.

P4: a designation for an NCP node.

P5: a designation for a VTAM node.

Path information unit: a unit of message traffic.

PIU: path information unit.

PU: physical unit.

Queuing time: the time spent waiting for access to a network resource. Queuing time can be one of the largest components of response time. Queuing time is dependent on the level of network activity. Queuing time is typically expressed as a multiple of the transmission time; it is closely related to the transmission time and to the level of network activity, which is expressed as the percentage of line utilization. Queuing time is a large component of response time and one of the most likely causes of a response-time problem symptom.

Response time: the time required for an entry from a network end point (such as a user terminal) to travel the network to a host, complete processing within the host, and travel back to the network end point. From a network user's perspective, response time is the interval between pressing the Enter key at a terminal or station and receiving a ready-for-additional-commands prompt in reply. In most cases, the travel time between the host and the end point is the largest component of response time.

SDLC: Synchronous Data Link Control.

Session: a connection between two logical units (e.g., two applications or an application and an end user) that establishes the rules and a path for communication between the two. Except for Advanced Peer-to-Peer Networking (APPN), all sessions are initiated through a host processor executing VTAM. Two logical units that are connected in this way are often referred to as being "in session."

SNA: Systems Network Architecture.

Subarea: a VTAM or NCP node (P5 or P4) and all the cluster controllers (P2s) or token rings that are attached and controlled by it.

TG: Transmission Group, an SNA definition that allows one or more SDLC links between adjacent communications controllers to be used as a single logical link. (A single System/370 channel can also be a transmission group.)

Think time: the time required for an end user to respond to a prompt from a terminal with an action. Studies have shown that think time varies with the terminal response time, and that as response time decreases to less than a second, and again to under half a second, think time decreases at an even faster rate.

Throughput: the amount of data that can be sent through the network in a given period of time. Throughput is sometimes confused with response time, which indicates how fast a single operation occurs. A network that can transfer 2 Megabytes of information in a second has twice the throughput of a network that can transfer 1 Megabyte per second. (The response time for each transfer, 1 second, is the same.)

Transmission time: the time required to move a message from the sending component to the receiving component within a network. Transmission time is composed of the baud rate or bits per second rate of the line, the time required for the link protocol, the time required for the routing process headers and trailers, the character code length, and the message length. Transmission time can typically vary from milliseconds to seconds.

Turn-around time: the time required for a network component to change from one mode of transmission (sending or receiving) to another. Turn-around time is unique to half-duplex circuits and/or operations.

Underutilization: a network problem that occurs when much of the capacity of a network resource is not needed by network users and is being wasted. (See also Overutilization.)

DOS/VSE: Disk Operating System/Virtual Storage Extended. A mainframe operating system developed by IBM that is an extension of an earlier operating system, Disk Operating System/Virtual Storage (DOS/VS).

VR: Virtual Route, an SNA definition that allows logical routes based on transmission priorities to be mapped to the real connections (explicit routes or ERs) that exist between two subareas.

VTAM: Virtual Telecommunications Access Method software. VTAM executing in a host processor system controls the interface between host applications and the network. It also maintains the domain configuration and initiates communications called "sessions" between the other network components. (A newer type of SNA component, the PU Type 2.1 node, can initiate sessions with another PU Type 2.1 node without VTAM intervention in a process is called Advanced Peer-to-Peer Networking or "APPN.")

XMT: transmission time.

1.3 Initialization of an SNA Network

A key aspect of the background of the invention is the manner in which initialization of an SNA network is normally accomplished. As is well known to those of ordinary skill, during initialization of a network a customized NCP program "load module" (executable program) is created for each communications controller or FEP by a network administrator who runs one or more utility programs to link selected program components together. The network administrator's customization of each load module includes selecting appropriate values for various network tuning parameters that are discussed in more detail below.

Load modules are selectively downloaded from a host computer running VTAM to one or more selected controllers on the network over a channel or a link. The controller stores the load module into local storage and formats its remaining storage for use as buffers for incoming and outgoing traffic. After the controller buffers are initialized, VTAM sends an "activation attempt" request message to the controller, which takes actions required to activate devices in its domain or subarea.

Importantly in the context of the invention, a controller being initialized is not operational to service network user requests during the downloading process (and also during the linking process if the controller has not been previously initialized). Thus, neither are any terminals or other devices that communicate with the host computer via the controller available for use on the network during controller initialization.

1.4 Overview of Selected SNA Network Operation Aspects

During normal network operations, a terminal device may send a message requesting that a "session" be established with an application program executing on the host computer system. The request for a session is relayed from the terminal device via one or more controllers (e.g., across zero or more intermediate links and a boundary link) to VTAM executing on the host computer. VTAM negotiates with the application program to establish the session and returns a session-establishment message to the terminal. The session then has a "virtual route"—a predefined route—over which message traffic can flow between the terminal device and the application program and vice versa.

If any link in a session's virtual route is lost, the entire session abnormally terminates. Some link redundancy may be available, however: a virtual route is assigned to a transmission group (TG) for each leg of its path, and a transmission group may be single- or multi-link. If one link in a multi-link transmission group fails, another link takes over without disruption of the virtual route. Session establishment is insensitive to the actual path.

A problem can arise from this approach if the links in a multi-link group have different speeds or throughput capabilities. If a slow link is activated first (or if a fast link goes down, is replaced by a slower link, but later is brought back up), the faster link will be selected for use only if the slower one is busy, even if the faster link is available, because the NCP keeps no knowledge, in this context, of what the fastest line is.

Abnormal or emergency operations of an SNA network notably include a buffer shortage on a communications controller. Controllers maintain several buffer pools, any of which can suffer a shortage. If a shortage occurs in an intermediate-link controller, the controller's response to the shortage typically is to slow down incoming traffic by setting a flag-type bit in a control block. If a shortage occurs in a boundary-link controller, the controller typically sends a RECEIVE NOT READY message, which also slows down incoming traffic, and additionally tries to speed up outgoing traffic.

Shutdown of a communications controller can occur, e.g., for routine or emergency maintenance, for replacement or augmentation of physical components, or for reconfiguration of the network, domain, or subarea. As part of the shutdown process, the controller's NCP sends a shutdown notification message to its domain or subarea devices and if possible to the host. At that point all virtual routes including that controller are lost. Each VTAM that "owns" such a virtual route is assumed to be responsible for knowing what virtual routes are dependent on that controller and to notify application programs (or other VTAMs that are making use of cross-domain messages) that were using the controller as part of their virtual routes that the route is lost.

1.5 Response Time and SNA Network Performance Limitations

As SNA networks grow, network performance is affected by imbalances between network resources and the needs of the network users. Such imbalances can create response time problems. When network user needs exceed network resource capabilities, network users must either accept less network service than they need or must wait longer to receive it. Network problems of any size can have a tremendous impact on the network's ability to move messages freely from source to destination.

The symptoms of an SNA network problem may be either external or internal. External symptoms can be observed by anyone who uses the network. The most obvious external symptom is a longer response time. Internal symptoms can only be observed using network performance tools. These symptoms may be labeled as bottlenecks, over- and underutilizations, and throughput problems.

It can be difficult to find the cause of a network problem because the symptoms are often inconsistent. Symptoms can appear gradually, suddenly, individually, or in combination, move from component to component, or appear and vanish for no apparent reason.

A network problem will frequently exhibit a response time or availability problem. Consequently, response time is a frequent starting point for identifying the cause of a network problem. Referring to FIG. 2, response time is an accumulation of time intervals contributed by each network component through which a message passes. Generally speaking, response time can be summarized as the aggregate of the transit time from the user to the processor (including modem delays, propagation delays, and queuing times), the turnaround time within the processor (normally insignificant in response-time calculations), and the transit time from the processor back to the user. Some of these time intervals are essentially constant, such as the line speed between two components. Other intervals are variable, such as queuing delay, the amount of time a message must wait in line behind other messages before departure for the next component along the route.

Queuing time is a primary component of response time. It is related to the level of network activity and thus to the balance between network users and network resources. When line utilization is low, most of the line capacity is available for transmitting messages so queuing time is also low. (When line utilization is too low, valuable line resources are being wasted.) When line utilization is high, little capacity is available for additional transmissions. The transmitting process is likely to find the line busy when it attempts the transmission. Messages accumulate in a queue and queuing time increases sharply. Line utilization and its relationship to queuing time indicates an imbalance between network users and network resources. When an imbalance occurs, line utilization and queuing time increase, and end users notice longer response times.

1.6 Potential Solutions to Network Response-Time Problems

Three possible solutions for network problems are hardware upgrades, load reduction or balancing, and tuning of the network. Each solution has positive and negative aspects.

Hardware upgrades increase capacity and/or speed. Increased capacity reduces line utilization by providing more paths, whereas increased speed reduces transmission time and hence queuing time by providing a faster path.

Load reduction lowers line utilization by reducing line traffic, e.g., through the use of data compression techniques, but does not necessarily address the underlying causes of internal network problems which thus can reappear when traffic increases to its former level. Load balancing lowers line utilization by changing the relationships between network users and network resources. Load balancing can be accomplished by internal balancing, which changes the network configuration to distribute the network users more evenly across the network resources, or by external balancing, which changes the network usage patterns to distribute the network users more equitably over time.

Tuning is a method of improving network performance by adjusting the parameters that influence network characteristics, as discussed in more detail in the following subsections.

1.7 NCP Tuning Parameters

A number of NCP parameters may be "tuned" to optimize SNA network performance. A detailed description of numerous selected tuning parameters is set out in the reference manual reproduced in microfiche Appendix 2, especially in Appendix B thereof.

Tuning is potentially the most economical solution for network problems because it can obtain optimum performance from existing network resources before making costly upgrades or disruptive redistributions. Moreover, a well-tuned network can actually make it easier to identify when upgrades and redistributions are needed and where they should be implemented.

Tuning parameters fall into several categories relating to (1) traffic workload, e.g., whether a communications line is used heavily or comparatively little; (2) traffic patterns, e.g., the extent to which traffic consists primarily of interactive transmissions vs. batch transmissions; (3) resource consumption, e.g., parameters limiting consumption of node resources such as buffers and CPU availability ("CPU" is more precisely denoted "CCU" or central control unit) in a controller; and (4) error handling and recovery.

For example, the MAXOUT parameter relates to the fact that on SDLC links and token ring links, a message counter is assigned to every message that goes out. The MAXOUT parameter, set at system generation time for the controller's NCP load module, establishes a maximum count of messages allowed to go out to a terminal attached to the controller before an acknowledgement comes back. Referring to FIG. 1, assume for example that ten messages are queued up to be sent by a controller P2, in a specified sequence, to an attached terminal device LU and the MAXOUT parameter for the controller is seven. After seven messages are sent out, the controller P2's NCP sends an "are you there?" poll message to the terminal device LU, which responds with an identifier of the last message that it received in proper sequence; any message sent out after that last is assumed to have been lost and is retransmitted. This gives the NCP positive confirmation of receipt, explicitly or implicitly, because a response from a terminal device that "I received message 3" implies that messages 1 and 2 arrived as well.

MAXOUT is a parameter that is set at system generation time for the NCP. It normally cannot be adjusted up or down for improved or degraded line conditions without regenerating the NCP, i.e., reinitializing the controller.

As another example, the parameter PASSLIM relates to a multi-drop line such as that shown in FIG. 2. In some installations an SDLC link (shown in the drawing as 37xx) will have connected to it a plurality of physical unit PU connections (shown as 3×74s), sometimes referred to colloquially as "drops." A parameter PASSLIM is used to implement "timesharing" of the network among the different drops. That parameter controls the maximum number of messages that will be sent to a particular drop before suspending the message traffic to that drop and beginning to send pending messages to another drop. That helps prevent slower drops on a multi-drop line (e.g., those attached to some printers and other batch-type device) from tying up the line.

Still another example is the segment size parameter, which affects the size of the segments into which network message traffic is divided to fit into, e.g., the buffer size of the receiving device. The permissible segment size might increase, e.g., as device hardware is upgraded, but the segment size cannot be increased without reloading the controller NCP. That would entail "cycling" (taking off line, then returning on line) all devices associated with the controller as well as any intermediate links that were dependent on that controller. Inasmuch as availability of network links is a major practical consideration, changes of that kind are not feasible during normal operations.

1.8 Difficulties of SNA Network Tuning

Tuning of an SNA network is a nontrivial task. It calls for knowledge of the configuration and usage patterns of the network and an understanding of the effects of the available tuning parameters. Tuning entails steps such as (1) collecting network statistical data, (2) analyzing the data to isolate any underlying problems, (3) selecting an appropriate course of action for tuning, and (4) implementing the selected tuning actions.

Equally important, tuning is a cyclic process whose usefulness depends in large part on how quickly the above-described four steps can be completed. Network activity can change significantly in minutes, but the underlying assumption of tuning—that past network performance is a useful predictor of future performance—is true only when tuning can be completed before network activity changes significantly.

Conventional tuning of an SNA network can be difficult because, among other reasons, (a) NCP parameter changes require program regeneration, reloading, and reactivation in all affected communication controllers; (b) the tuning process often takes too long to be of any real use before network conditions make the particular tuning obsolete; (c) tuning is based on past activity rather than current activity and often entails tuning to the average rather than to the high and low levels of network activity; (d) tuning requires specialized knowledge of network configurations, NCP parameters, and equipment specifications; (e) changes often cannot be made quickly enough to optimize the major interactive and batch shifts that can occur in a network over a typical 24-hour period; (f) tuning must be constantly repeated as network configuration and work loads change. As a result, in many installations the network is tuned manually for "average" conditions but is not optimized for existing conditions at any given time.

Moreover, network tuning is never "finished." Even if a network administrator succeeds in perfectly tuning the network, the network configuration and network activity often change so quickly that re-tuning is required. For example, software upgrades and new software packages change the amount of end user activity and the load distribution. Hardware failures change network activity and the load distribution as messages are routed around the failed equipment. New hardware and hardware upgrades change the load distribution. Adding or moving end users to different points on the network change network activity and the network load. Separate scheduling of batch and interactive sessions change network activity. Network tuning changes activity and the load distribution. Some of these changes are unanticipated and unwanted, requiring additional tuning changes.

In short, SNA network tuning is very much an iterative process. The effectiveness of tuning, and thus its usefulness as a network management technique, may well depend on how quickly each iteration can be planned and completed.

2. SUMMARY OF THE INVENTION

A method in accordance with the invention is implemented via a set of novel computer programs referred to for convenience as NEWPROG. One type of NEWPROG program, referred to herein as a "controller NEWPROG," resides (executes) in one or more communication controllers on an SNA network as a "front end" processor or monitor for the NCP executing in that controller. The controller NEWPROG uses interception techniques to monitor the controller's incoming and outgoing messages and thereby 1) collect statistical information about network performance, and 2) exchange "backchannel" messages with controller NEWPROGs operating in adjacent controllers. In addition, the controller NEWPROG can alter dynamically the tuning parameters in that NCP by selectively overwriting the controller storage in which the parameter values are stored.

Another NEWPROG program, referred to as a "host NEWPROG," executes in a host computer on the network. The host NEWPROG provides a user interface—in effect a monitoring and control station—for a user such as a network administrator.

The host NEWPROG communicates with controller NEWPROGs on the network via a virtual logical unit (VLU) executing in at least one controller. The host NEWPROG and controller NEWPROGs collectively act as a set of "shadow" control programs operating behind the scenes, so to speak, as though they constituted a distributed monitor system. The shadow programs collaborate to optimize network performance by activating tuning parameters directly in the NCP without a program regeneration; collecting statistics that are applicable to tuning; making performance improvement recommendations; allowing a network administrator manually to alter tuning parameters and have the change take effect immediately; and dynamically tuning NCP resources automatically without network administrator intervention (automatic tuning is performed by the controller NEWPROG without involvement of the host NEWPROG). Use of the method permits NCP tuning parameters to be tuned to meet existing conditions as those conditions change.

3. BRIEF DESCRIPTION OF THE DRAWINGS

Figure 4:
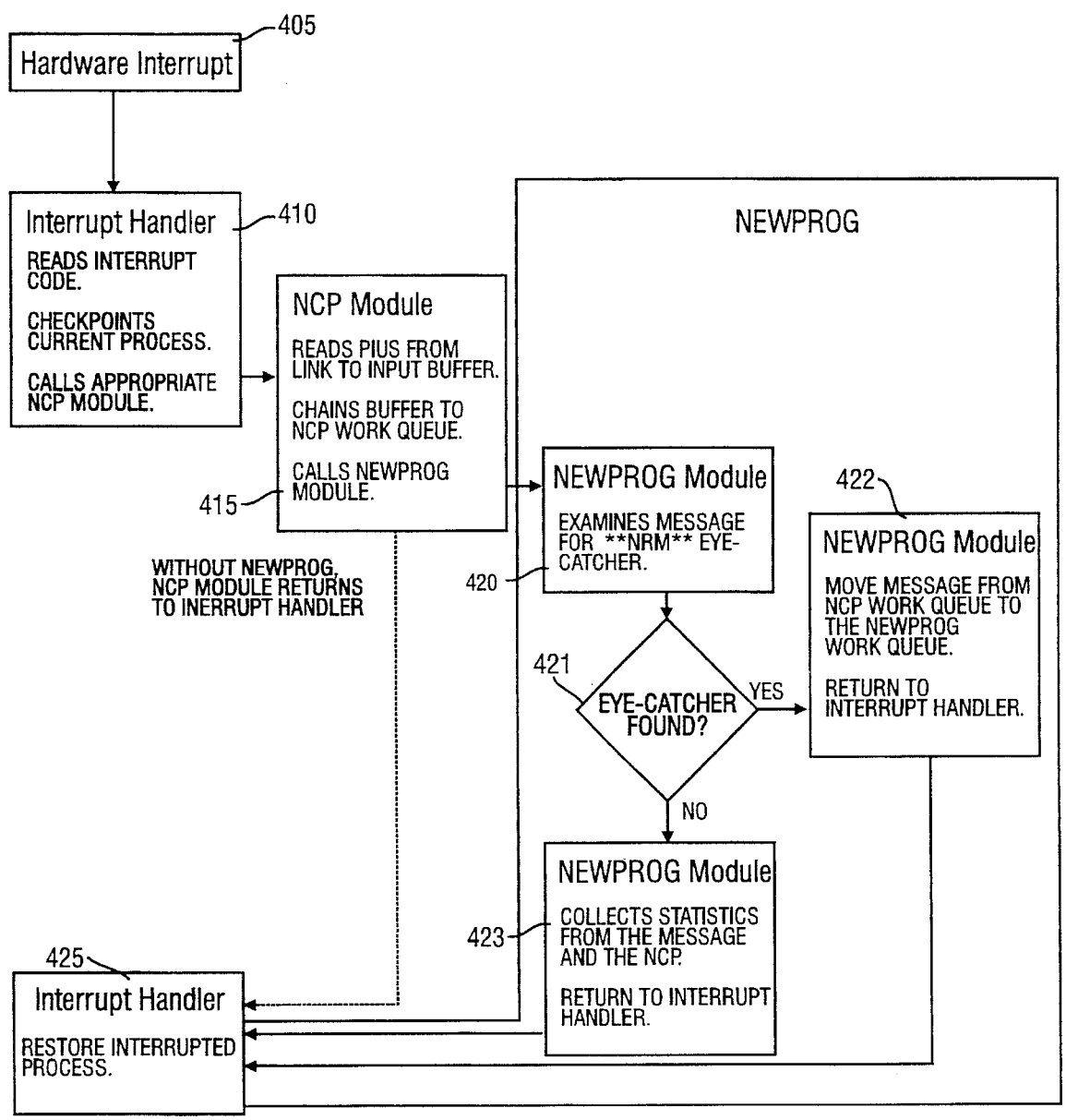
Figure 5:
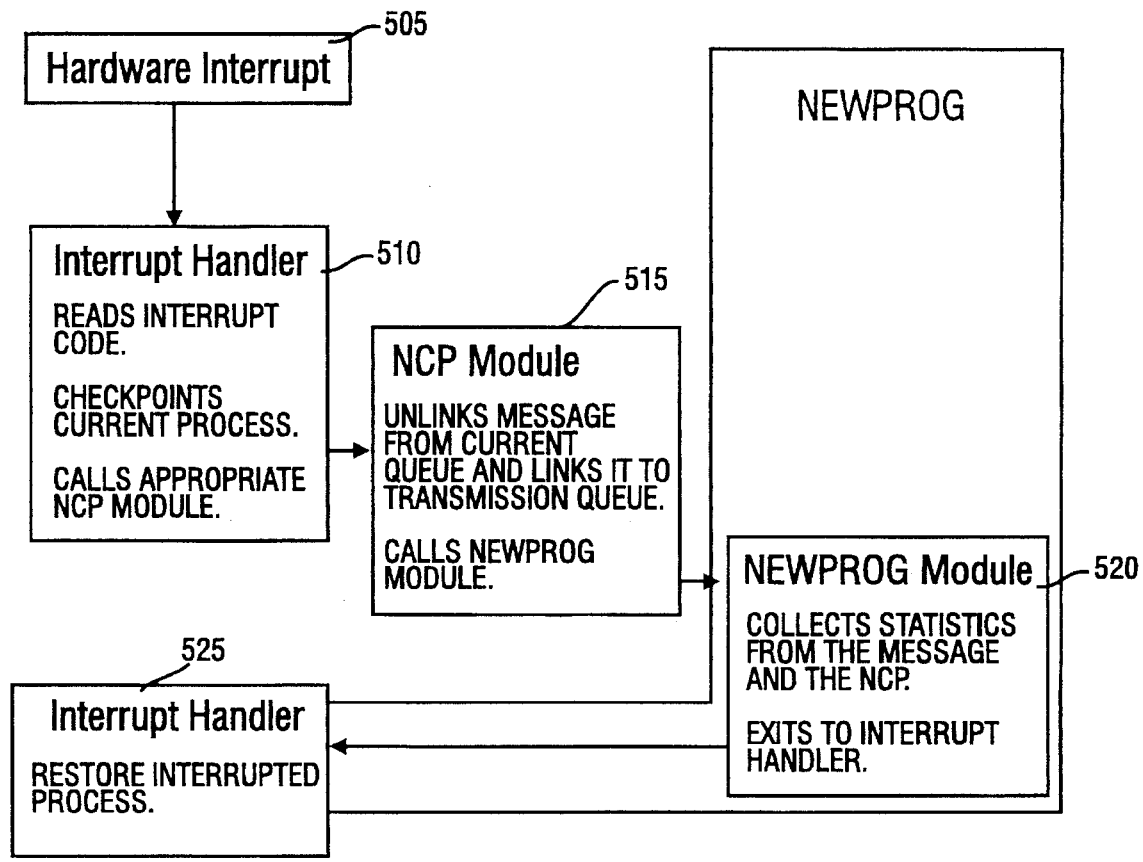
Figure 6:
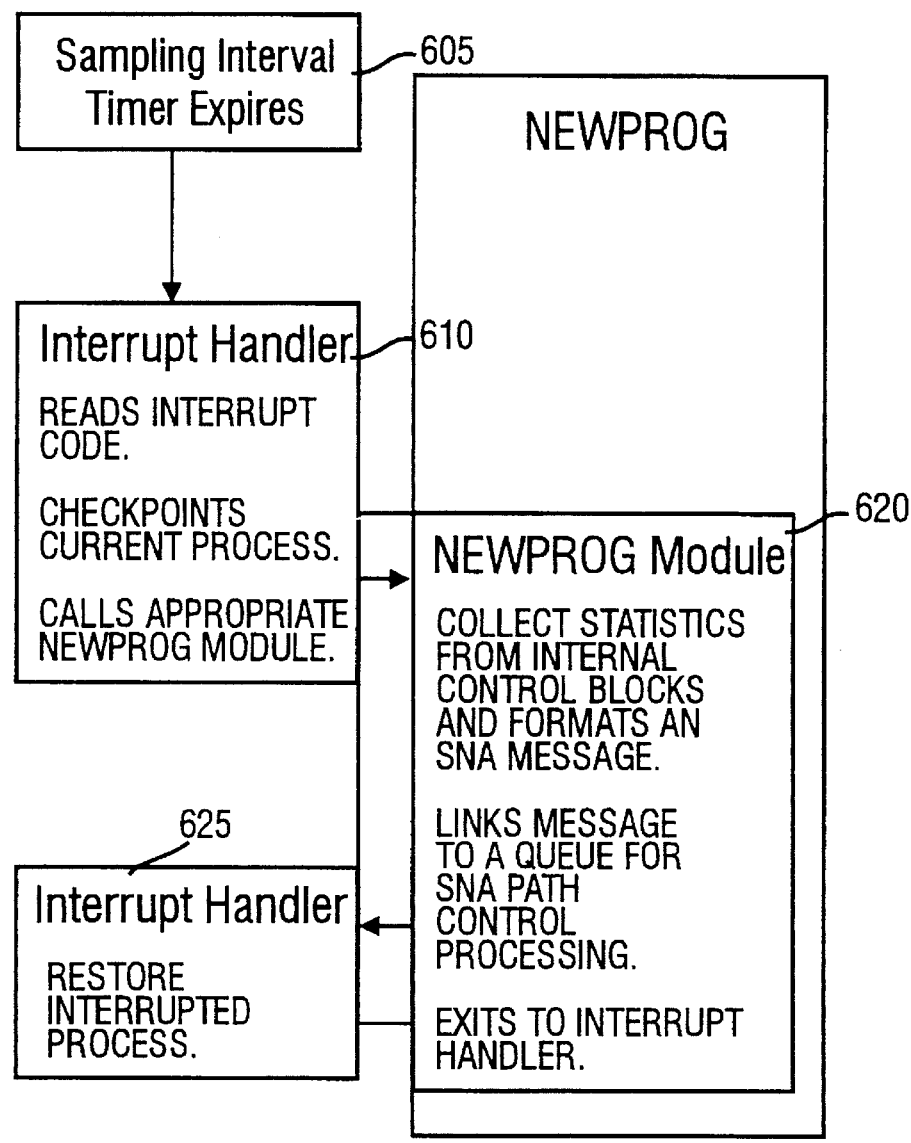

FIGS. 4, 5, and 6 are flow charts showing the operation of a controller NEWPROG in monitoring incoming messages (FIG. 4) and outgoing messages (FIG. 5) at a controller and in generating a statistics message for transmission to another NEWPROG (FIG. 6).

Figure 7:
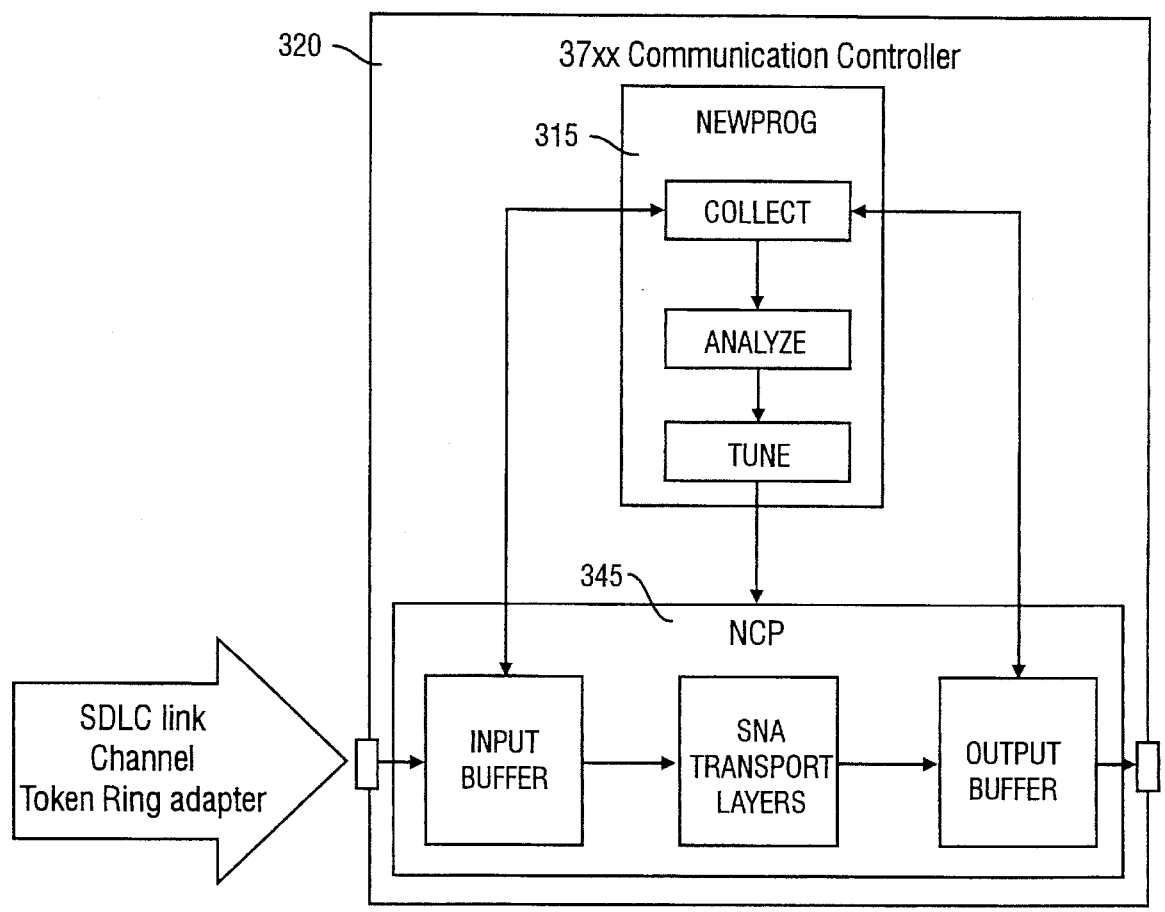

FIG. 7 is a block diagram depicting the activity of a controller NEWPROG in generating statistical information about network performance.

Figure 8:
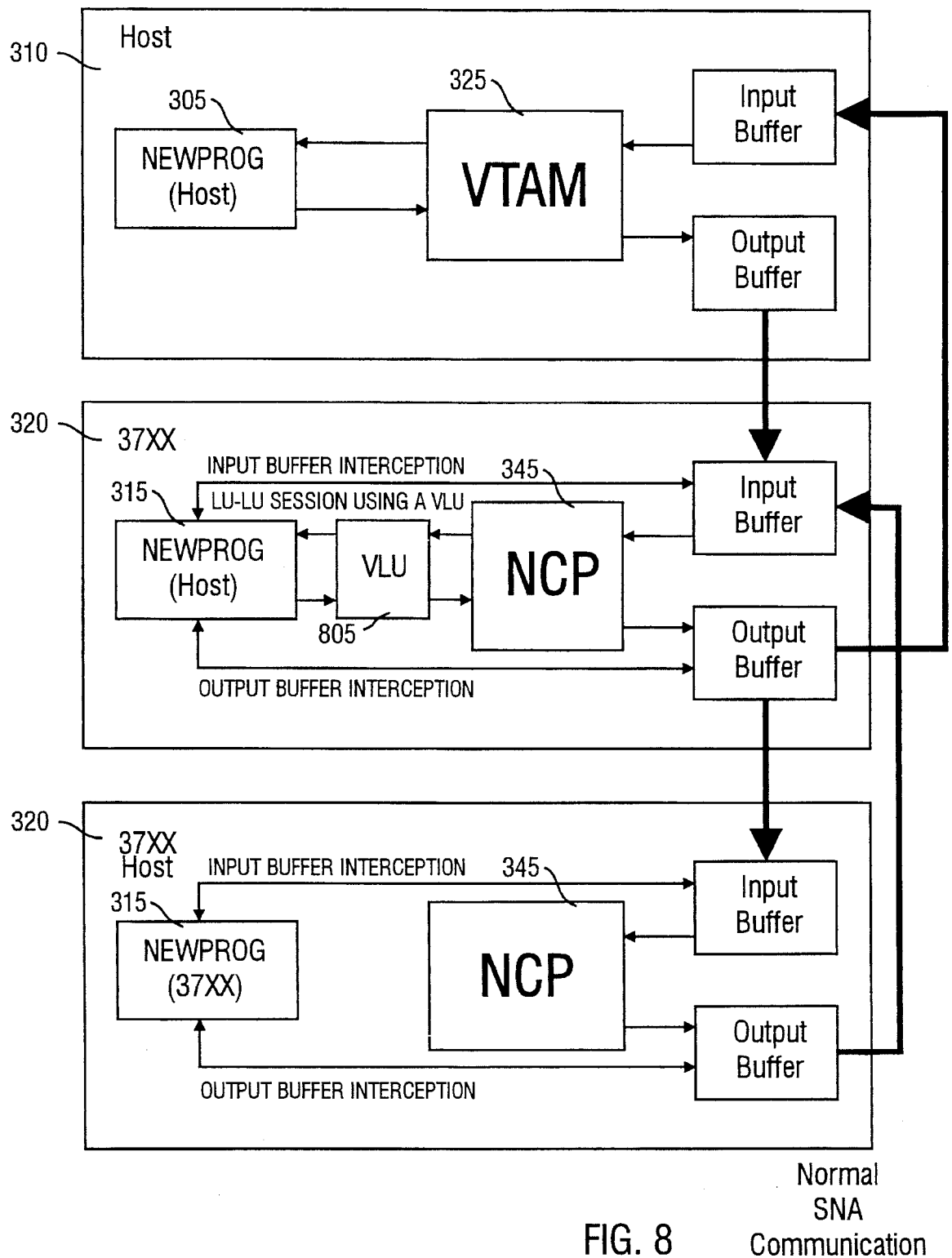
Figure 9:
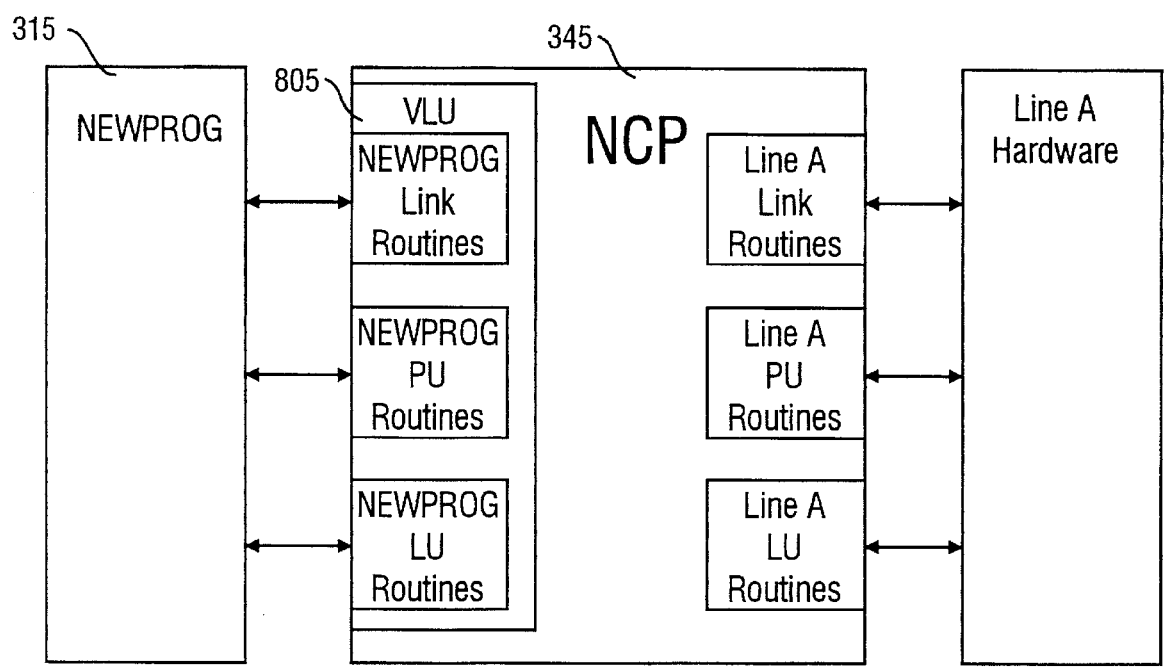
Figure 10:
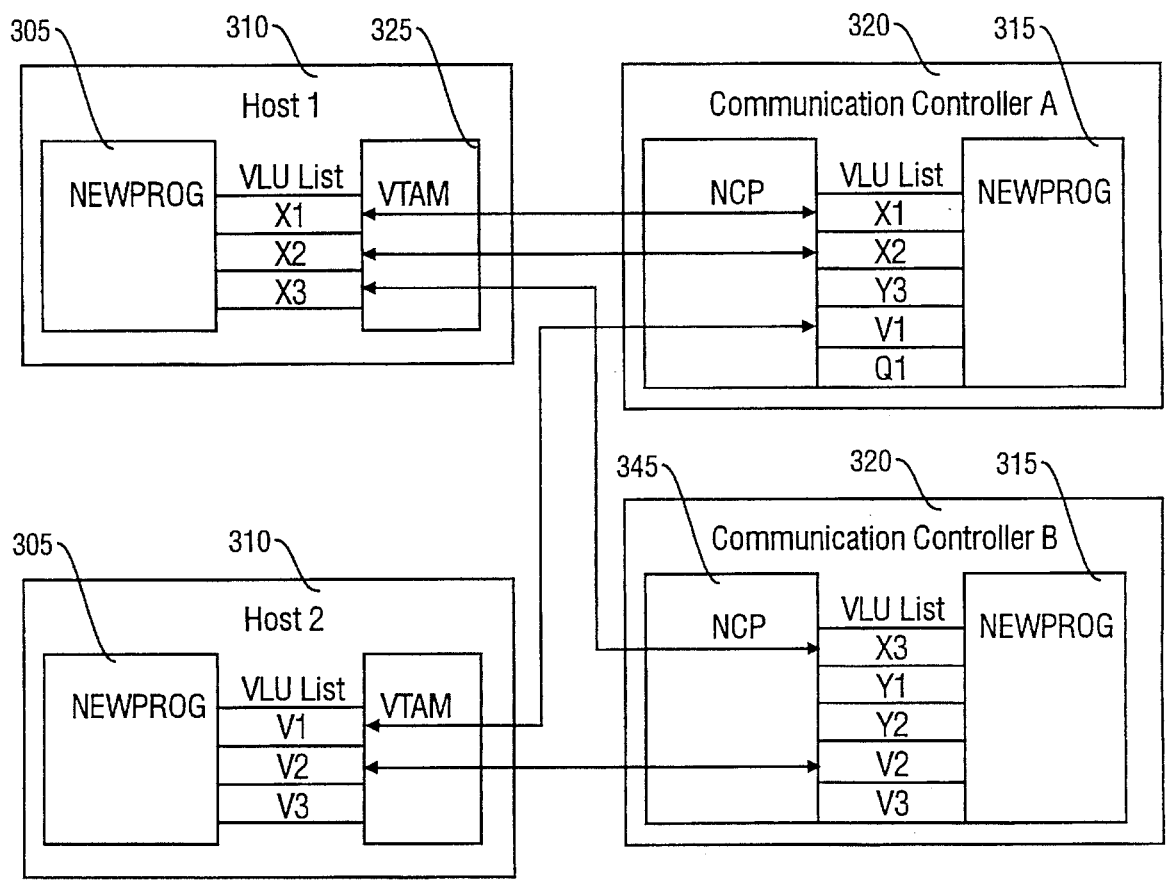

FIG. 8 is a block diagram and data-flow diagram of a host NEWPROG and of two controller NEWPROGs, one with and one without a virtual logical unit (VLU). FIG. 9 is a block diagram illustrating the relationships among a controller NEWPROG, a VLU, and an NCP. FIG. 10 shows a multifaceted NEWPROG/VLU relationships among a plurality of controllers and a plurality of hosts.

FIG. 11 is a table summarizing available tuning parameters in an illustrative implementation of the invention.

4. DETAILED DESCRIPTION OF SPECIFIC EMBODIMENTS

One illustrative embodiment of a method in accordance with the invention is described in some detail below as it might be implemented in a set of computer programs referred to collectively as "NEWPROG." In the interest of clarity, not all features of an actual implementation are described in this specification. It will of course be appreciated that in the development of any such actual implementation, as in any software development project, numerous programming decisions must be made to achieve the developers' specific goals and subgoals (e.g., compliance with system- and business-related constraints), which will vary from one implementation to another. Moreover, attention will necessarily be paid to, e.g., proper serialization to handle concurrent events. It thus will be appreciated that, as in any software development project, such a development effort could be expected to be complex and time consuming, but would nevertheless be a routine undertaking of program development for those of ordinary skill having the benefit of this disclosure.

4.1 Overview of Illustrative NEWPROG Architecture

Figure 1:
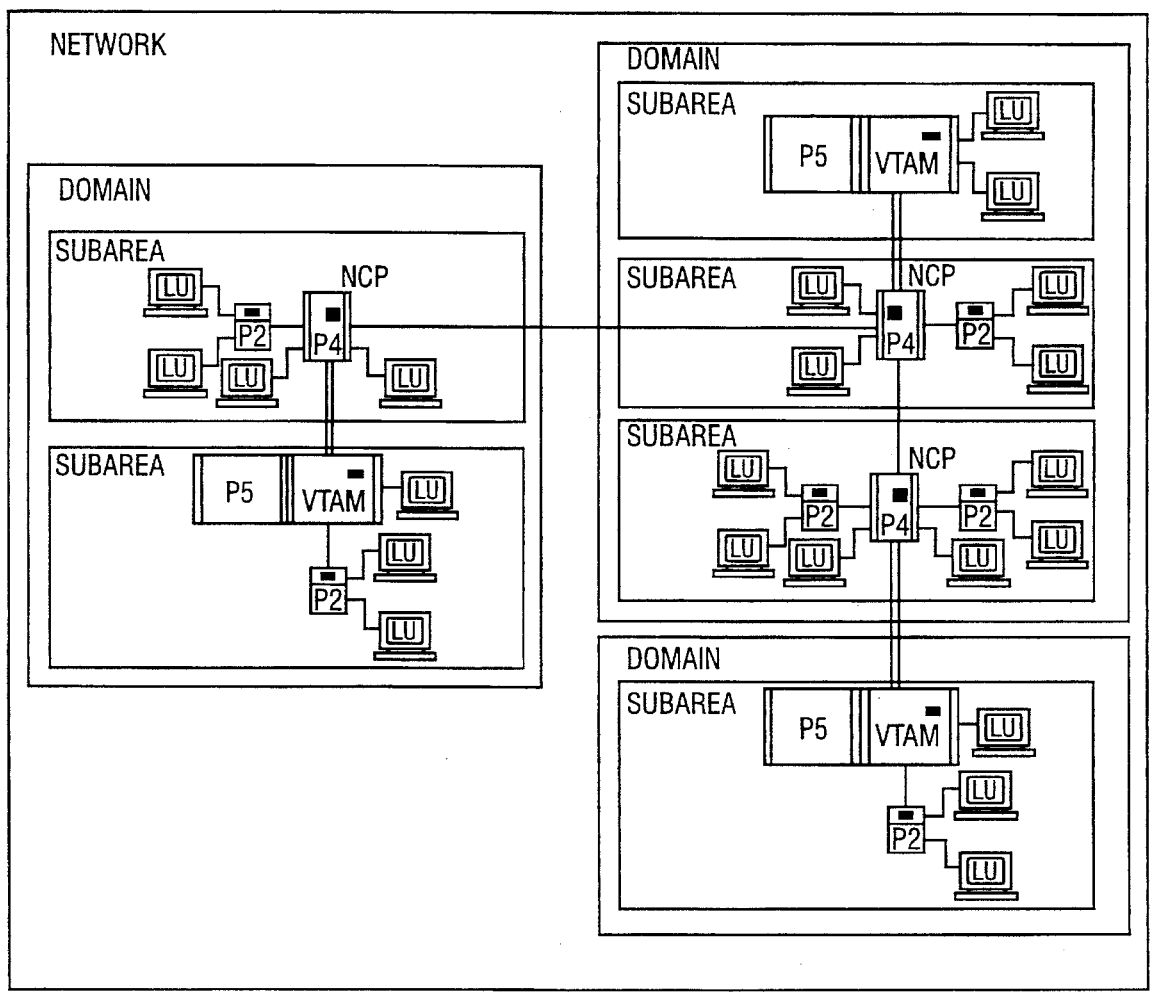
FIG. 1 is a block diagram illustrating the hierarchical structure of an SNA network.
Figure 2:
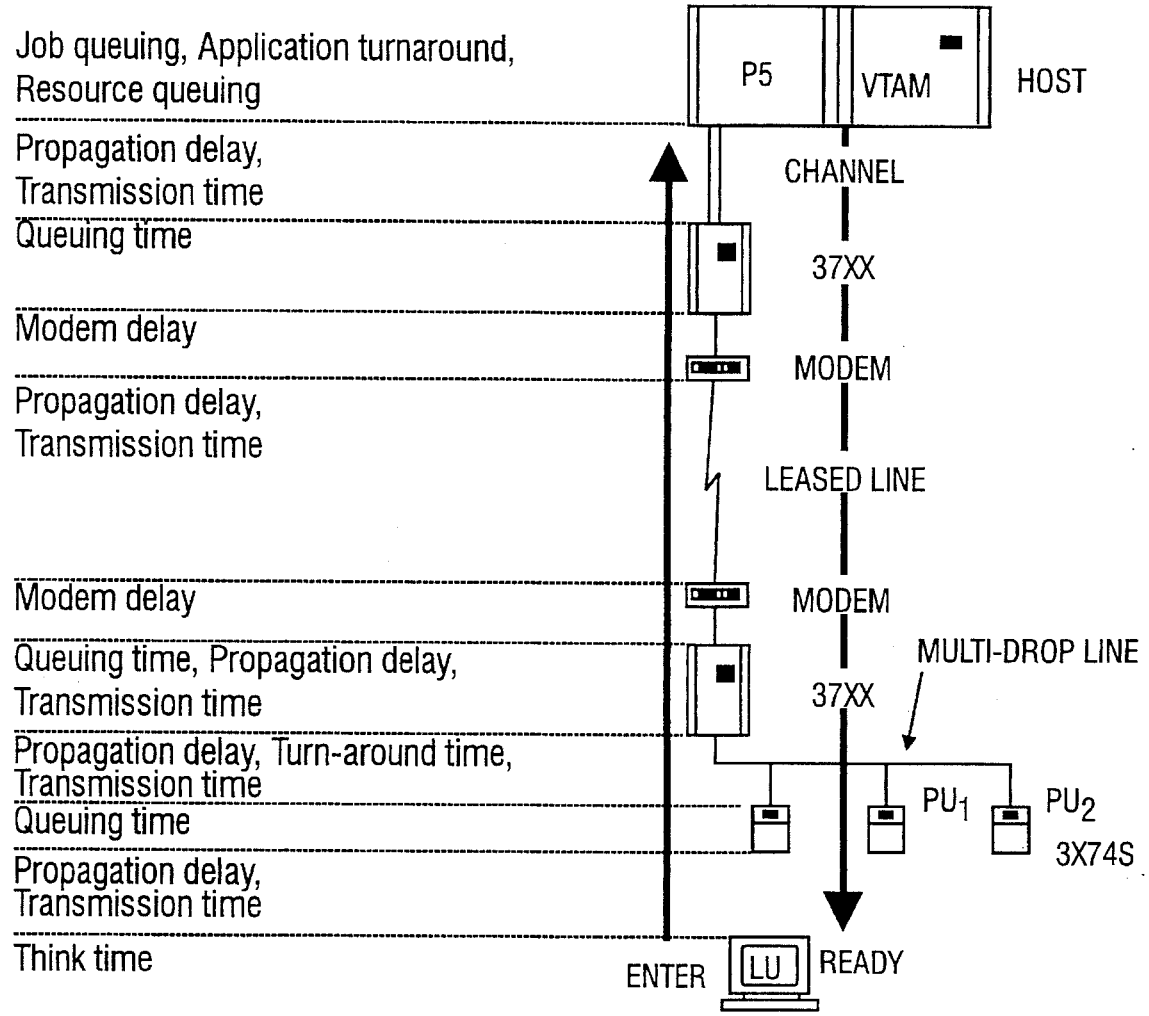
FIG. 2 is a functional block diagram showing a typical message path from an end-user at a terminal LU to a host computer P5 and back.
Figure 3:
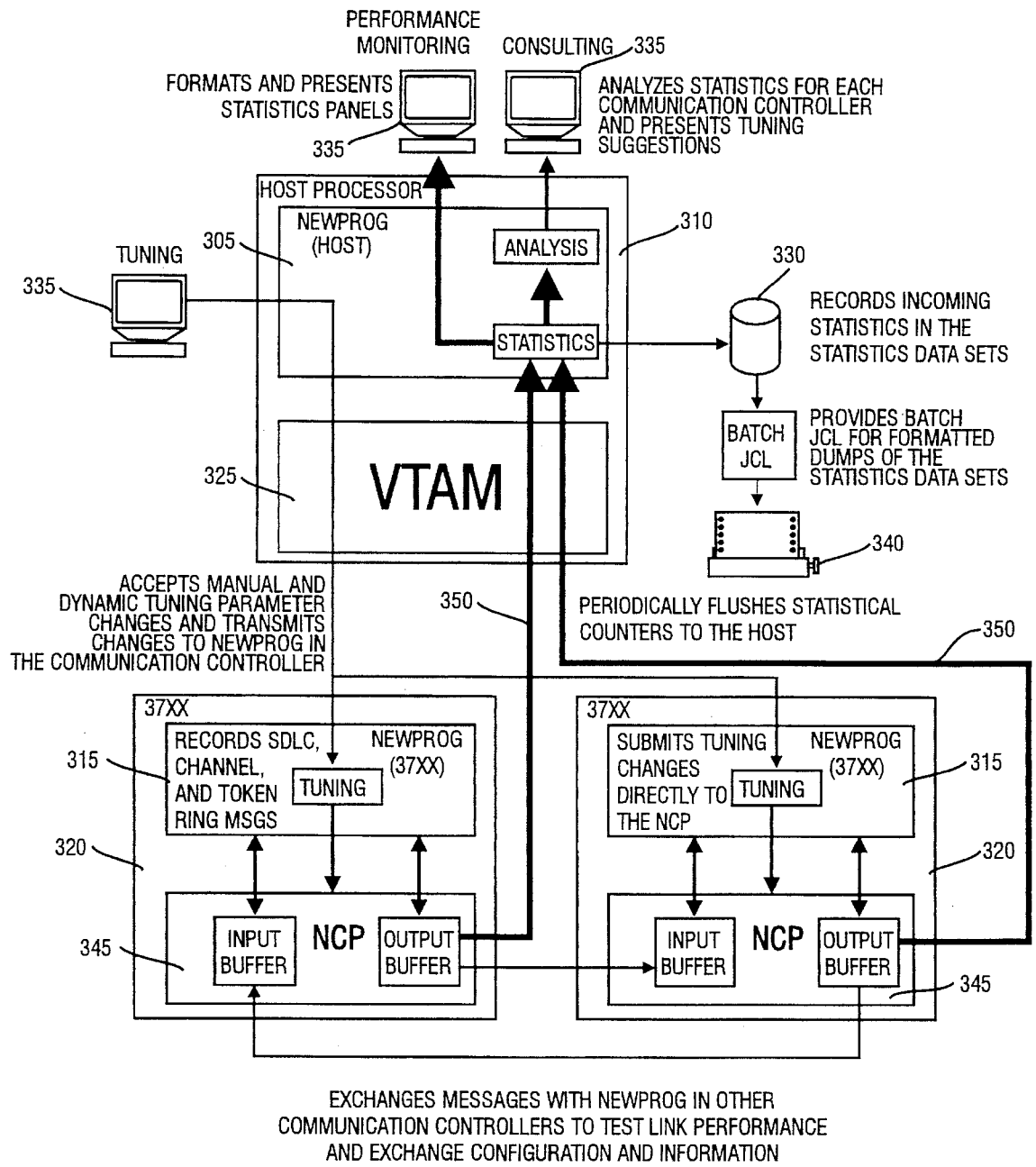
FIG. 3 is a block diagram showing an implementation of a set of NEWPROG programs in an SNA network and illustrating data flows among the NEWPROGs.

Referring to FIG. 3, the illustrative NEWPROG software comprises two principal programs. One program, referred to as a "host NEWPROG" and shown in FIG. 3 as "NEWPROG (Host)" 305, executes on a host processor 310 such as a mainframe computer. Another program, referred to as a "controller NEWPROG" and shown in FIG. 3 as "NEWPROG (37xx)" 315, executes on a communications controller 320.

4.1(a) Host NEWPROG Program

The host NEWPROG program 305 may execute in an MVS address space or DOS/VSE partition as a standard application. It interfaces to a VTAM program 325 executing on the host processor 310 as well as to the processor's storage subsystem 330. The host NEWPROG 305 may be designed to provide a convenient Common User Access (CUA) user interface, e.g., via one or more terminals 335 for use by, e.g., a network administrator, and to print reports via a suitable output device such as, e.g., a printer 340. The host NEWPROG 305 provides look-up access to the NCP parameters; detailed performance statistics; tuning suggestions; statistics and security data sets; and batch output capabilities.

The host NEWPROG 305 may be designed to maintain three particular data sets in the storage subsystem 330. The first two data sets hold the statistics that arrive from NEWPROG on each controller 320. These data sets may be used alternately; when one is full, NEWPROG begins overwriting the other. The third file may be a security data set that contains an encrypted list of users having access to NEWPROG. This data set also may contain the settings of the NEWPROG options.

The host NEWPROG may also be designed to support batch functions, e.g., conventional routines that execute independent of NEWPROG and can be used to access the two statistics data sets. The batch routines may provide suitable statistical reports that summarize network performance, e.g., as described in more detail in the reference manual reproduced in microfiche Appendix 2. Options in the batch JCL can permit a user such as a network administrator to specify the content and format of the reports.

4.1(b) Controller NEWPROG

The controller NEWPROG 315 is loaded in and executes in the controller 320's main storage (not shown) along with a network control program (NCP) 345. The controller NEWPROG 315 software modules may be linked to the standard NCP modules during NCP generation in the usual manner, with a controller NEWPROG initialization module being defined as the exit routine to be driven by the NCP at initialization time. A comparatively large block of storage is defined in the load module as though it were to be used for program code storage, but in fact is used as an "anchor block" or control block for storage of configuration information. As part of the controller NEWPROG initialization, an initialization tuning module is called to adjust those parameters that must be set at initialization time.

The controller NEWPROG 315 is designed to "hook" into specific NCP modules. As is well known to those of ordinary skill and summarized here for convenience, generally speaking such hooks are placed by copying the first three instructions of the NCP module into a static work area and then overwriting those instructions with a branch instruction that passes control to an appropriate controller NEWPROG module. When the NCP module is called (e.g., via a hardware-interrupt handler), control is immediately passed to the controller NEWPROG module. At an appropriate point during execution of the controller NEWPROG module, the three instructions copied to the static work area from the original NCP module are executed and control is returned to the fourth instruction in the NCP module. Thus, in effect the controller NEWPROG 315 module is hooked in as a "front end" to the NCP module. The NCP modules hooked in this manner may include XMTINIT (SDLC), CX$LNKR (interception of noninformation frame traffic on an SDLC link), CXJQHSIF (incoming messages), CXJQHSC3 (error message detection), CXJQHSP2 (retransmission), CXJQCBC (channel adapter traffic), ECLMRCV (token ring receive module), and ECLMXMT (token ring transmit module).

An overview of the basic functions of the controller NEWPROG 315 is provided in FIG. 4, FIG. 5, and FIG. 6. During normal operation of the controller 320, an event occurs such as a hardware interrupt 405 or 505 or the expiration of a sampling interval timer 605. In response to the event, control is passed by the controller 320's processor in the usual manner to an NCP interrupt handler 410, 510, or 610, which performs conventional functions such as reading the interrupt code and noting the existing system status and passes control to an NCP module 415 or 515 that is appropriate for the kind of event that occurred.

At an appropriate point in the execution of the NCP 345, control is conventionally "hooked" by the controller NEWPROG 315. As is well known to those of ordinary skill, hooking involves overwriting of an instruction in the NCP 345 so that the NCP, instead of executing its original instruction, passes control to a controller NEWPROG module 420, 520, or 620. The controller NEWPROG module performs specific processing, depending on the system status, and returns control to the NCP interrupt handler at 425, 525, or 625.

As shown in summary form in FIG. 7 and discussed in more detail below, the controller NEWPROG 315 collects statistics from a variety of sources, including channels, SDLC links, and token ring adapters. It records statistics such as origin, destination, and timestamp of messages. As the controller NEWPROG 315 initializes, it collects data about the links and devices connected to the controller 320 and selects optimum statistical values based on equipment characteristics and capabilities. The goal of the controller NEWPROG 315 is to ensure that to the extent practicable, the NCP tuning parameters do not present a bottleneck to controller performance.

Each time the controller NEWPROG 315 adds statistics to its internal counters it also compares the updated counters against its optimum values. If it detects statistics that differ from the optimum values, it calls routines to determine if it can dynamically correct the problem. At regular intervals, the controller NEWPROG 315 collects its statistics and sends them to the host NEWPROG 305 as shown at transmission 350 in FIG. 3.

The controller NEWPROG 315's analysis and tuning routines may be designed in a conventional manner to execute using the lowest communication controller processor interrupt level (level 5) to minimize their effect on SNA activity. Such a design can help ensure that in all but the busiest moments, the controller NEWPROG 315 program reduces idle and wasted communication controller processor cycles.

4.1(c) Controller Virtual Logical Unit (VLU)

An important aspect of the invention is that the host NEWPROG 305 and the controller NEWPROG 315 can exchange messages. One standard approach to such a message exchange would be to establish an LU-to-LU type of VTAM session over the network between the host NEWPROG 305 and the controller NEWPROG 315. Because the NCP software 345 was originally designed on the assumption that it is the only software executing in a controller 320, however, it does not recognize the existence of other logical units executing within the controller 320 itself, and thus cannot conventionally provide a communications interface between such a logical unit and the network.

Referring to FIG. 3 and FIG. 8, this problem is addressed by establishing an LU-to-LU VTAM session between the host NEWPROG 305 and the controller NEWPROG 315 using an additional program, executing in the controller 320, referred to as a "Virtual Logical Unit" (VLU) 805. Detailed techniques useful in designing and implementing a VLU are documented in IBM's NCP customization manual for implementing a controller monitor, reference number LY30-5571.

Referring to FIG. 9, the VLU 805 executes within the controller 320 with the controller NEWPROG 315 and the NCP 345; it provides a communications interface between the controller NEWPROG 315 and the host NEWPROG 305 using standard VTAM and NCP communications services. Generally speaking, the VLU 805 interface to the NCP 345 is indistinguishable to the NCP 345 from the interfaces that perform transmissions to real logical units across real links. The VLU 805 exchanges conventional protocols with the NCP 345, but instead of driving a real link and logical unit, it transfers the message between the appropriate NCP 345 queue and the appropriate controller NEWPROG 345 queue. For example, the VLU 805 receives from the NCP 345 messages originated by the host NEWPROG 305 and intended to be received and processed by the controller NEWPROG 315. Instead of driving a real link and logical unit, however, the VLU 805 simply unlinks the message from the NCP 345's queue of messages to be transmitted and links it to a work queue of incoming messages maintained by the controller NEWPROG 315. The VLU 805 likewise sends messages, originated by the controller NEWPROG 315, to the NCP 345 for retransmission to the host NEWPROG 305, in a similar fashion.

During NEWPROG installation a VLU 805 may be defined for each controller 320 that will be executing a controller NEWPROG 315. This simplifies the installation procedure and provides additional VLU capability, but is not a NEWPROG requirement. A VLU 805 may be defined with the VIRTUAL=YES statement for the LU definition in the NCP generation. This statement causes the Logical Unit Function Vector Table (LUFVT) of the NCP 345 to point to NEWPROG routines (see FIG. 9) instead of to the normal SDLC line handler routines. Once a VLU 805 is defined and installed, it exists within the controller 320 until the next time the NCP 345 modules are regenerated and reloaded. The VLU 805 can be either active or inactive, depending on whether or not it is "in session" via VTAM with a host NEWPROG 305.

Referring to FIG. 10, defining a VLU 805 in each controller 320 that executes a controller NEWPROG 315 provides the network adminstrator with flexibility in changing the locations and numbers of VLUs in the network once the network and NEWPROG are in operation. Any host NEWPROG 305 can have more than one VLU session with a controller 320 (although use of a second VLU 805 executing in the same controller 320 as a backup is not advisable in some circumstances because any problem that causes one VLU 805 to fail is also likely to cause the second one to fail). A VLU list, maintained by the host NEWPROG 305, lists those VLUs 805 known to the host NEWPROG 305. It is not necessary that all those VLUs 805 be in session. Indeed, maintaining a large number of inactive VLU definitions by the host NEWPROG 305 can lead to problems with VLU session establishment attempts between the host NEWPROG 305 and controller NEWPROGs 315 that are similar to those that occur when a large number of inactive PUs are polled on a SNA SDLC link. A controller NEWPROG 315 can have VLU-LU sessions with multiple host NEWPROGs 305, but each session must use a different VLU 805 in the controller 320.

VLUs 805 are preferably defined so that each controller NEWPROG 315 in a network has an SNA path to both a primary and backup VLU 805. With such SNA communications paths defined, any controller NEWPROG 315 can communicate with a host NEWPROG 305, either directly via its own VLU 805 or by a relay via another controller 320's VLU 805. It is normally preferable for primary and backup VLUs to reside in different controllers 320, thus allowing controller NEWPROGs 315 to continue operating in the event of a failure on the part of the controller 320 containing either the primary or backup VLU 805. After NEWPROG has been used for initial tuning of a network, the network administrator can reduce the number of VLUs 805 within the network by deactivating some of the sessions between the host NEWPROG 305 and the VLUs 805; reducing the number of VLUs makes it easier to perform NEWPROG session management from the host computer system 310.

4.2 Interception-Type Monitoring of Network Communications

The controller NEWPROG 315 utilizes interception techniques to monitor NCP communications of its controller 320 for two principal purposes: Statistical tracking of network usage, and communication with other controller NEWPROGs 315.

4.2(a) Interception Monitoring of Incoming Messages

Referring to FIG. 4, and as is well known to those of ordinary skill, the NCP 345 controls the controller 320 in receiving and processing incoming messages. As shown in simplified form in block 415, in normal operation the NCP 345 receives message units (path information units or PIUs) from the network link, copies the message units to a block of local memory referred to as an input buffer, and chains the input buffer (actually, a pointer to the input buffer) onto a work queue of pending incoming messages.

At that point, and as illustrated at blocks 415 and 420 through 423, the controller NEWPROG 315 "hooks" in to obtain control. The controller NEWPROG 315 examines the message for an "eye-catcher" text pattern such as NRM. If such a text pattern is present, the controller NEWPROG 315 assumes that the message is a "backchannel" message from another controller NEWPROG; it accordingly "moves" the input buffer containing the message from the NCP work queue to an internal work queue for the controller NEWPROG 315. On the other hand, if the eye-catcher is not present, the message is assumed to be a "real" message; the controller NEWPROG 315 accordingly collects network-operations statistics relating to the message.

4.2(b) Interception Monitoring of Outgoing Messages

Referring to FIG. 5, the controller NEWPROG 315 monitors outgoing messages in a fashion very much similar to that for incoming messages. As shown in simplified form in blocks 510, 515, and 520, the controller NEWPROG 315 "hooks" NCP 345 instructions to transmit output buffers over the network, collects network-operations statistics relating to the message, and returns control to the NCP 345 so that the outgoing message can be sent.

4.3 Intercontroller Communication via Buffer Interception

Input and output buffer interception as described above may be used by one controller NEWPROG 315 to communicate with another NEWPROG 315 executing in another controller 320 without the use of VLUs 805 and the attendant SNA LU-LU sessions. As noted above, outgoing message buffers are intercepted by a controller NEWPROG 315 before the associated NCP 345 sends the outgoing messages over the network. As illustrated in FIG. 8, a sending controller NEWPROG 315 can send an outgoing message to a receiving NEWPROG 315 in another controller 320 by chaining a message buffer having an eye-catcher pattern and (in a special backchannel header area of the message) an identifier of the receiving NEWPROG 315 to the NCP work queue while the sending NEWPROG 315 has control. Because the message includes the eye-catcher pattern, the receiving NEWPROG 315 treats it as a backchannel message as discussed above. If the message identifier indicates that the receiving NEWPROG 315 is the intended destination of the message, then the receiving NEWPROG 315 can take appropriate action. On the other hand, if the message identifier indicates that some other controller NEWPROG 315 is the intended destination, then the receiving NEWPROG 315 can forward the message over the network in the same manner.

Messages to a controller NEWPROG 315 can contain host-generated requests for the receiving controller NEW- PROG or another controller NEWPROG to change NCP parameters or to enable/disable dynamic NCP parameter changes; configuration messages from adjacent controller NEWPROGs; or test messages from adjacent controller NEWPROGs. FIG. 6 shows a sequence of steps that may be taken by a controller NEWPROG 315 to format and send a statistics message.

4.4 Collection of Real-Time Network Status Information

When the controller NEWPROGs 315 and host NEW-PROG 305 are in place, they can use their "backchannel" communications and message interception capabilities to collect essentially real-time topological information and statistical performance information about the network. This information in turn can be communicated to a network administrator and/or used in dynamic or manual tuning of the network. Detailed information about the specific statistics collected is set forth in Chapters 5 through 9 of the reference manual reproduced in microfiche Appendix 2.

4.4(a) Exchange of Configuration & Test Messages

Neighboring controller NEWPROGs 315 may exchange configuration information during initialization and additionally at other times during network operation.

Configuration message exchanges are similar to the configuration exchanges performed by the NCP 345. Configuration messages, however, concentrate on NEWPROG-related issues such as whether or not the neighboring sub area controller is executing a controller NEWPROG; the path to a VLU 805; the current status of the sending NCP 345; and tuning parameter changes, if any, relayed from the host NEWPROG 305.

Test messages may be sent periodically between controller NEWPROGs in adjacent subareas to measure the line speed of the link between the two controllers, as discussed in more detail below.

The circulation of configuration and test messages throughout the NEWPROG subareas of the network allows NEWPROG to monitor the performance of network pathways for tuning considerations such as ordering of the multi-link transmission group list (the test message response is used to calculate intermediate network node (INN) line speeds to be displayed and for use in multi-link transmission group tuning to use the highest-speed link first when possible); virtual route transmission priority threshholds; the RETRIES parameter; and balancing of the MAXDATA parameter against the number of link retransmission operations. The configuration messages may also be used to update a routing topology data structure. When configuration messages are circulated to identify the types and locations of the network components, the resulting responses may be stored at the controllers 320 and at the host 310 for future reference. This updating is preferably performed on an interval basis to maximize the productive use of CPU time.

4.4(b) Test-Message Synchronization of Controller Clocks

A series of test messages may be used to "synchronize" (determine the relative offset between) the clocks in adjacent controllers 320 so that network line speed can be more accurately measured. One possible sequence of test messages is described below.

Suppose that two adjacent controllers 320 are referred to as controller A and controller B. Also suppose that at some arbitrary reference time as indicated by the system clock of controller A (referred to as "time 00:00(A)"), a time-tick test message including a time-stamp of the time of transmission is sent by controller NEWPROG A to controller NEWPROG B.

Assume that the controller NEWPROG B receives the message at a time, as indicated in the system clock of controller B, of five seconds after some reference time (referred to as "time 00:05(B)"). Not enough information is known yet to permit a confident estimate of line speed, because the relative offsets between the two system clocks is not known.

The controller NEWPROG B therefore sends a reply message to the controller NEWPROG A at time 00:07(B). The reply message includes 1) the time of receipt 00:05(B) of the test message, and 2) the time of reply 00:07(B), each as indicated on the system clock of controller B. Implicitly, the reply message also includes the turnaround time of two seconds, i.e., 00:07(B) minus 00:05(B).

Assume that the controller NEWPROG A receives the reply message at time 00:08(A) as indicated on controller A's system clock. The controller NEWPROG A therefore can compute an estimate of one-way transmission time and thus of line speed by subtracting the turnaround time of two seconds from the total roundtrip message exchange time of eight seconds and dividing by two.

The resulting estimate of one-way transmission time is thus three seconds. The computed time of receipt of the first test message by controller NEWPROG B, as indicated on the system clock of controller A, would thus have been 00:03(A). Given that the same time of receipt as actually indicated on the clock of controller B was 00:05(B), it follows that the clock in controller B is estimated to lag that in controller A by two seconds. If desired, controller NEWPROG A can relay that information to controller NEWPROG B. Alternatively or in addition, controller NEWPROG A can generate its own reply message to controller NEWPROG B to permit controller NEWPROG B to make its own estimate of clock offset (and perhaps to compare or average the two estimates). In the same manner, a series of offset estimates can be made to estimate the relative drift of two adjacent clocks.

4.4(c) Collection of Statistics

The controller NEWPROG 315 collects statistics from the messages (referred to in SNA terminology as Path Information Units or PIUs) that pass through the controller 320. The interception techniques described in Section 4.2 result in controller NEWPROG routines being called each time a Synchronous Data Link Control (SDLC), channel, or token ring adapter message is placed in an NCP input or output buffer. The controller NEWPROG routines examine information in the PIU transmission header and, if the message is a "backchannel" message to another controller NEWPROG, in the special backchannel header that a controller NEWPROG in one controller 320 can append to a PIU for the controller NEWPROG in another. The information collected is stored in control blocks maintained by the controller NEWPROG for each link, physical unit, virtual route, and transmission group associated with the corresponding controller 320 as well as general FEP statistics for that controller.

4.4(d) Periodic Transmission of Statistics to Host NEW-PROG

The controller NEWPROGs' statistics-gathering and tuning operations occur as messages are placed in input and output queues rather than on a preset time interval. However, the NEWPROG statistics counters are sent to the host regularly at the end of each sampling interval. At the conclusion of each sampling interval the controller NEW-PROG 315 gathers and packs statistical counter values into a message, transmits the message to the host NEWPROG 305, and zeros the statistical counters in preparation for the next sampling interval.

4.5 Tuning of Network Parameters

The NEWPROG programs permit a network administrator to review NCP tuning parameters for possible use in tuning network performance. FIG. 11 summarizes the parameters that are available for manual and dynamic tuning in an illustrative implementation. Detailed information about those parameters is set out in Appendix B of the reference manual reproduced in microfiche Appendix 2.

In the illustrative implementation, automatic dynamic tuning can be selectively enabled for different parameters by the network administrator; NEWPROG adjusts enabled dynamic options based on the statistics that it continually gathers within the controller 320.

For either manual or dynamic tuning, NEWPROG can present recommendations to the network administrator. These recommendations are available for all units, from front end processors to link. The recommendations can be tuning parameter changes, load redistribution, or hardware upgrades. NEWPROG may suggest a tuning parameter change when it determines a parameter that needs to be adjusted is either disabled for dynamic tuning or cannot be dynamically tuned. It may suggest a load redistribution or hardware upgrade when it determines that tuning cannot effectively improve NCP performance.

In dynamic tuning, as a general proposition NEWPROG attempts to optimize NCP buffer utilization and controller CPU utilization as its highest priorities. Detailed information concerning an illustrative NEWPROG optimization approach is shown in the source code extracts reproduced in microfiche Appendix 1.

It will be appreciated by those of ordinary skill having the benefit of this disclosure that numerous variations from the foregoing illustration will be possible without departing from the inventive concept described herein. For example, it will be apparent that in a peer-to-peer type network, all network nodes may execute the equivalent of an NCP 345 with no equivalent to a host processor 310. The functions performed by the host NEWPROG 305 could readily be performed by a selected one or ones of the controller NEWPROGs 315. The NEWPROG programs may be implemented in a wide variety of system architectures, e.g., in single-process/multi-thread systems or multi-process/single-thread systems, as desired.

Accordingly, it is the claims set forth below, and not merely the foregoing illustration, which are intended to define the exclusive rights claimed in this application.

What is claimed is:

1. A tunable Systems Network Architecture network, referred to as a SNA network, comprising:
   (a) a plurality of controllers each of which transmits messages to and receives messages from other said controllers via one or more communications links, each said link providing a communications path between two said controllers;
   (b) a plurality of network control program control processes, referred to as NCP processes, each one of said plurality of NCP processes executing in one of said plurality of controllers and controlling said transmission and receipt of messages by said one of said plurality of controllers in accordance with at least one of a plurality of tunable parameters; and
   (c) a plurality of controller-NEWPROG subprocesses, each one of said controller NEWPROG subprocesses executing as part of a respective one of said plurality of NCP processes, wherein each said controller-NEWPROG subprocess (1) monitors the messages transmitted and received by said respective controller and (2) alters one or more of said plurality of tunable parameters without regenerating said respective one of said plurality of NCP processes, wherein at least one of said plurality of tunable parameters is selected from the group consisting of Boundary PIU Pool, CWALL, SLODOWN, AVGPB, DATAMODE, GP3174, IRETRY, MAXDATA, MAXOUT, PASSLIM, RETRIES(n), RETRIES(t), TG Low Priority Threshold, TG Medium Priority Threshold, TG High Priority Threshold, TG Total Priority Threshold, Current Window Size, Minimum Window Size, Maximum Window Size, VR PIU Pool Threshold, DELAY, HDXSP, LSPRI, Multi-Link TG List, PAUSE, RETRIES(m), SERVLIM, and TRANSFR.

2. The tunable SNA network of claim 1, further comprising a host processor executing a host-NEWPROG process.

3. The tunable SNA network of claim 2, further comprising a plurality of virtual logical unit subprocesses each respectively executing as part of a respective said NCP control process and providing a virtual communication path between said controller-NEWPROG subprocess and said host-NEWPROG process.

* * * * *